US009766393B2

United States Patent
Cabanne et al.

(10) Patent No.: US 9,766,393 B2
(45) Date of Patent: Sep. 19, 2017

(54) LIGHT MODULE FOR MOTOR VEHICLE DAYTIME RUNNING LIGHT

(71) Applicant: Valeo Iluminacion, Martos (ES)

(72) Inventors: Damien Cabanne, Martos (ES); Alberto Rodriguez-Fuentes, Jaen (ES); Jose Castillo Jimenez, Martos (ES); Jose-Antonio Aguilar Del Moral, Jaen (ES)

(73) Assignee: Valeo Iluminacion, Martos (ES)

( * ) Notice: Subject to any disclaimer, the term of this patent is extended or adjusted under 35 U.S.C. 154(b) by 223 days.

(21) Appl. No.: 14/662,492

(22) Filed: Mar. 19, 2015

(65) Prior Publication Data

US 2015/0268406 A1     Sep. 24, 2015

(30) Foreign Application Priority Data

Mar. 20, 2014   (FR) .................................... 14 52340

(51) Int. Cl.
*F21S 8/10*     (2006.01)
*F21V 8/00*     (2006.01)
*G02B 1/04*     (2006.01)

(52) U.S. Cl.
CPC ........ *G02B 6/0063* (2013.01); *F21S 48/1241* (2013.01); *F21S 48/1364* (2013.01);
(Continued)

(58) Field of Classification Search
CPC ... F21V 2200/13; F21V 2200/15; B60Q 1/18; B60Q 1/1296; B60Q 1/24; B60Q 1/28; B60Q 1/30; B60Q 2400/30; F21S 48/1159; F21S 48/1195; F21S 48/1241; F21S 48/1323; F21S 48/1329; F21S 48/1335; F21S 48/1364; F21S 48/137;
(Continued)

(56) References Cited

U.S. PATENT DOCUMENTS 8,727,574 B2   5/2014  Simchak et al.
8,950,915 B2   2/2015  Natsume
(Continued)

FOREIGN PATENT DOCUMENTS

| DE | 20211305 U1 | 10/2002 | |
| DE | 10200359 A1 | 7/2003 | |
| DE | 10311317 A1 | 9/2004 | |
| DE | 102010061210 A1 | 6/2012 | |
| EP | 2075501 A2 | 7/2009 | |
| EP | 2489550 A2 | 8/2012 | |
| FR | 2813654 A1 | 3/2002 | |
| FR | 2890917 A1 | 3/2007 | |
| FR | 2934353 A1 * | 1/2010 | .......... F21S 48/1145 |
| WO | 2012040280 A2 | 3/2012 | |

OTHER PUBLICATIONS

Machine translation of FR2934353A1, Gasquet et al., retrieved Dec. 13, 2016.*

*Primary Examiner* — Anh Mai
*Assistant Examiner* — Steven Horikoshi
(74) *Attorney, Agent, or Firm* — Jacox, Meckstroth & Jenkins (57) ABSTRACT

A light module comprising a means for supporting at least one collector of light rays in the vicinity of which there is a light guide suitable for guiding the rays emitted by a light source from an input face to at least two distinct and adjacent output faces. A distinction is made between a main output face, through which the rays pass in a first direction, and at least one additional output face which is oriented such that the light rays leaving the guide through this additional output face are directed toward the collector, in a second direction distinct from the first direction.

20 Claims, 3 Drawing Sheets

(52) U.S. Cl.
CPC .......... *F21S 48/211* (2013.01); *F21S 48/212* (2013.01); *F21S 48/215* (2013.01); *F21S 48/2206* (2013.01); *F21S 48/2231* (2013.01); *F21S 48/2237* (2013.01); *F21S 48/2243* (2013.01); *F21S 48/2268* (2013.01); *F21S 48/2281* (2013.01); *F21S 48/234* (2013.01); *F21S 48/24* (2013.01); *G02B 1/045* (2013.01); *G02B 6/0036* (2013.01); *G02B 6/0055* (2013.01)

(58) Field of Classification Search
CPC ............... F21S 48/1376; F21S 48/1747; F21S 48/211–48/215; F21S 48/2225–48/2293; F21S 48/234; F21S 48/24; G02B 6/0008; G02B 6/001; G02B 6/0063
See application file for complete search history.

(56) References Cited

U.S. PATENT DOCUMENTS

| | | | |
|---|---|---|---|
| 2004/0208019 A1* | 10/2004 | Koizumi | F21S 48/2237 362/545 |
| 2006/0193137 A1* | 8/2006 | Chinniah | F21K 9/00 362/326 |
| 2007/0147063 A1* | 6/2007 | Collomb | H01H 19/025 362/551 |
| 2008/0013333 A1* | 1/2008 | Koizumi | B60Q 1/2696 362/511 |
| 2012/0140481 A1 | 6/2012 | Simchak et al. | |
| 2013/0201709 A1 | 8/2013 | Natsume | |

* cited by examiner

LIGHT MODULE FOR MOTOR VEHICLE DAYTIME RUNNING LIGHT

CROSS-REFERENCE TO RELATED APPLICATIONS

This application claims priority to French Application No. 1452340 filed on Mar. 20, 2014, which application is incorporated herein by reference and made a part hereof.

BACKGROUND OF THE INVENTION

1. Field of the Invention

The present invention deals with the field of motor vehicle lighting and/or signaling and it relates more particularly to the design of light modules suitable for emitting daytime running lights.

2. Description of the Related Art

In recent years, motor vehicle constructors have been required to equip the front of their vehicles with daytime running lights (DRL). These daytime running lights are constantly on when the main beams or the low beams are not on. These daytime running lights are regulated as to the color that they have to emit, namely a white color.

Like any type of motor vehicle lighting and/or signaling, the function of daytime running lights must meet regulatory standards, notably in this case standards relating on the one hand to photometry and on the other hand to the minimum lighting surface area. In other words, on the one hand the intensity and the direction of the light rays emitted by the daytime running lights should be correctly calibrated and on the other hand the surface area used to produce this daytime running light function should be greater than a minimum regulatory threshold.

It will be understood that this issue of minimum lighting surface area can be problematic when the headlights of motor vehicles comprising such light modules are particularly carefully designed.

What is needed, therefore, is a light module that overcomes one or more of the problems in the prior art.

SUMMARY OF THE INVENTION

The present invention falls within this context, and it proposes a light module comprising a means for supporting at least one collector of light rays, in the vicinity of which there is a light guide suitable for guiding the rays emitted by a light source from an input face to at least two distinct and adjacent output faces. There are thus provided a main output face, through which the rays pass in a first direction, and at least one additional output face adjacent to the main output face, and therefore not parallel therewith, such that it is oriented for the light rays leaving the guide through this additional face to be directed toward the collector, in a second direction distinct from the first direction.

Thus, the lighting surface area can be increased by using one or more collectors, which can moreover be used to reflect light rays emitted by a light source which is specific to them, since the light guide is clear of the field of reflection of the collector or collectors. It will be understood that it is by the fact that the additional output face is adjacent to the main output face, and therefore not parallel therewith, that the guide can have its own optical function and also use the neighboring collector or collectors, without hampering the optical function produced otherwise by the collector or collectors.

According to different features of the invention,
- the at least one additional output face is substantially at right angles to the main output face;
- the light guide is produced in a material suitable for being passed through by light, such as a transparent material, notably polymethylmethacrylate or polycarbonate;
- the main output face and/or the additional output faces comprise toruses taking the form of pillows, prismatic elements, ridges or graining;
- the main output face is provided with toruses taking the form of pillows, whereas the additional output faces are provided with prismatic elements;
- the light guide and the light source are respectively fixed onto the support means such that the light source is positioned facing the input face of the light guide;
- the light guide is fixed onto the support means via a fixing deck;
- the fixing deck comprises an anchoring area bearing means for fixing the deck onto the support means, and a fixing area for the light guide;
  - an intermediate bearing element is positioned between the deck and the light guide.

It will be possible to envisage a first application in which the light module comprises a single collector suitable for deflecting the light emitted by a primary light source. In this case, an additional optical system is provided, positioned to one side of the collector and which comprises the light guide, the light guide comprising two output faces, one of these output faces being oriented toward this single collector.

It will also be possible to envisage, in another application, that the support means bears two collectors suitable for deflecting, substantially parallel to the optical axis, the light emitted by a primary light source respectively associated with each of the collectors. In this case, an additional optical system is provided, positioned between the collectors and which comprises a secondary light source suitable for emitting rays into the light guide, the light guide comprising three output faces, including a main output face substantially at right angles to the optical axis and two opposing additional output faces and respectively oriented toward each of the collectors.

In this latter case of application to two collectors, according to different embodiments:
- the light guides extends substantially over the entire height of the collector and has a tubular form, the light source being positioned under the collector facing the input face of the light guide formed at an axial end of the guide and the additional optical system further comprises a fixing deck via which the light guide is fixed onto the support means. The fixing deck can then comprise an anchoring area bearing means for fixing the deck onto the support means, and a fixing area for the light guide, and the fixing area can be arranged to allow the insertion of the light guide laterally into the deck, by having snap-fitting means co-operating with complementary snap-fitting means borne by the light guide to keep the latter in position in the fixing deck.
- the light guide extends substantially to mid-height of the collector and comprises a head bearing output faces and a tubular body extending the head substantially along the optical axis, the light source being position facing the input face positioned at the end of the body opposite to the head and the additional optical system further comprises a fixing deck and an intermediate fairing via which the light guide is fixed onto the support means, the intermediate fairing being adapted to bear the light guide and to be fixed onto the deck, the deck being fixed onto the support means.

The invention also relates to a motor vehicle in which a light module as has been described previously is installed for the lighting and/or signaling of the motor vehicle.

Other features and advantages of the invention will become apparent on reading the following detailed description of an embodiment and for an understanding of which reference will be made to the attached drawings in which:

DETAILED DESCRIPTION OF THE PREFERRED EMBODIMENTS

Hereinbelow, the longitudinal direction L will designate the direction of travel of the motor vehicle, and the transverse direction T will designate a direction horizontal and at right angles to this longitudinal direction. The vertical direction V will designate the direction at right angles to the preceding two, which moreover define a horizontal plane. The trihedron L,V,T is placed in the figures to help in the reading thereof. However, it will be understood that the light module can be arranged with another orientation without departing from the context of the invention.

A light module 2 comprises a support means 4 on which are mounted at least one primary light source, not represented here, and at least one elliptical collector 6 adapted to reflect the rays emitted by the primary light source which is associated with it toward an optical element borne by the support.

The optical element is positioned at the second focus of the elliptical collector whereas the primary light source must be positioned substantially at the first focus of the collector, to the right of the clearance formed in the support. This arrangement allows most of the rays emitted by the primary light source and passing through the second focus of the collector to be reflected by the optical element in the direction of lighting corresponding to its optical axis.

These primary light sources emit directly into the collector and ensure high or low beam lighting functions when they are on, automatically or by manual control by the driver.

According to the invention, the module further comprises at least one additional optical system 8, positioned in the vicinity of the collector or collectors, and this optical system ensures the daytime running light function, on when the high and low beam lighting functions are off.

The additional optical system comprises a secondary light source 10, suitable for emitting light into a light guide borne by a deck secured to the means for supporting the light module. This additional optical system is particularly suitable for guiding the light emitted by the secondary light source toward at least two distinct output faces.

There now follows a description of the embodiments of the invention in which the module comprises two collectors mounted on the support means.

Each collector comprises a substantially elliptical reflecting surface, which can be produced in the form of an angular segment of a substantially rotational part. It can however be noted that the surface need not be perfectly elliptical and can have several specific profiles designed to optimize the light distribution in the lighting beam produced by the module, as is illustrated in the figures. There are then two primary light sources, each being borne by the support means to be associated with one of the collectors as described previously, in the vicinity of the first focus of the corresponding collector. The two collectors are here arranged so that their respective second foci are substantially merged at a point where the focus of the optical element is placed.

The two collectors are mounted on the support means 4 so as to be positioned side by side in the transverse direction, by forming an intermediate area 12 which extends between the two collectors 6.

The intermediate area comprises, in the top part, a bearing surface 14 substantially flush with the collectors and, in the bottom part, a longitudinally hollowed-out housing 16.

The support means has, on its top wall, a groove 18 which longitudinally extends the bearing surface of the intermediate area.

The intermediate area has dimensions that are appropriate for receiving the additional optical system 8, comprising, as described previously, a light guide 20 and a fixing deck 22.

The fixing deck comprises, in the rear part, defined thus arbitrarily relative to the orientation of the trihedron selected in the figures, an anchoring area 24 in the module, suitable notably for penetrating into the housing formed in the intermediate area between the collectors, and, in the front part, a fixing area 26 for the light guide 20, to keep the latter in position equally relative to the collectors and relative to the secondary light source, which is thus made to face the fixing deck.

The anchoring area 24 here has a top part 28, of which the curved rear face is suitable for following the curved form of the intermediate area, and a substantially straight bottom part 30.

Figure 1:
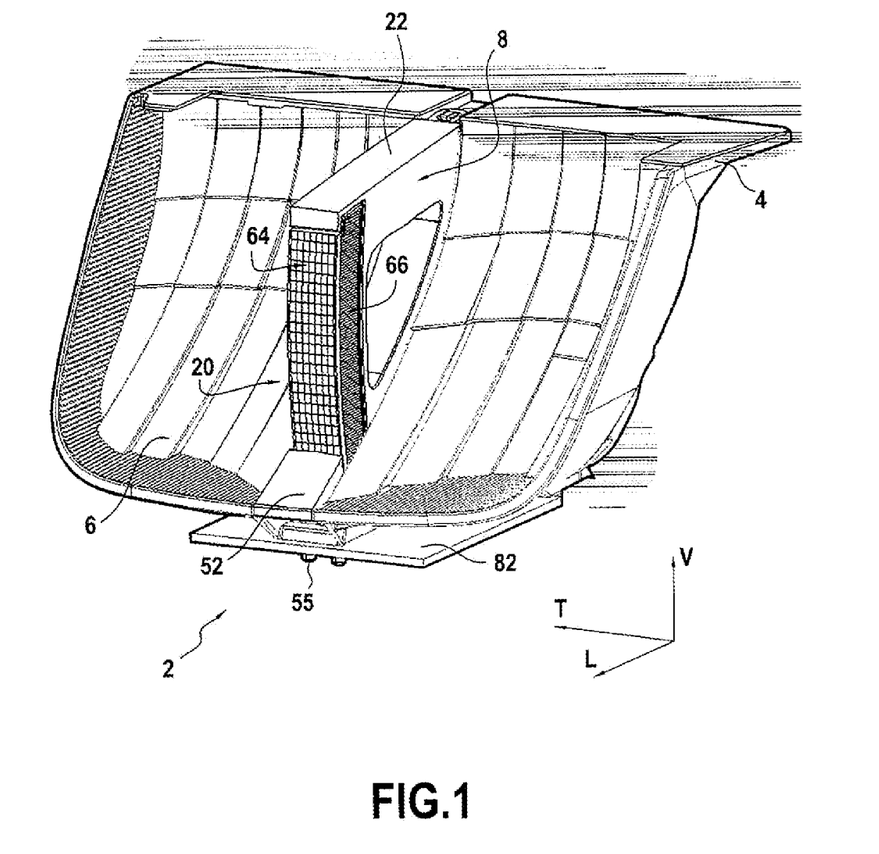
FIG. 1 is a perspective representation, three-quarter front, of a light module according to a first embodiment.

The top part has its center hollowed out for weight and design reasons, this part of the deck being visible when the deck is mounted against the intermediate area between the collectors (as can be seen in FIG. 1).

The anchoring area bears two snap-fitting fixing elements in the support means. The male element 32, in the form of a plug, is formed protruding from the bottom part 30, turned away from the fixing deck and from the associated light guide, and this male fixing element is adapted to be plugged into a socket 34 formed in the housing 16 formed in the bottom part of the intermediate area 12. A female element, in the form of an eyelet 36, is adapted to come to be engaged around a vertical pin 38 formed for this purpose in the central groove 18 of the support means. It can be seen that the male fixing element in the bottom part is plugged in a longitudinal direction at right angles to the direction in which the eyelet is fitted around the pin. Thus, the fixing deck is immobilized in the three directions of space and it offers a stable support for the light guide.

As can be seen in the figures, the fixing area of the light guide is positioned longitudinally forward of the anchoring area. It has a support face 40 formed by the front face of the anchoring area, extended at its top vertical end by a longitudinal tab 42 which provides a vertical position stop for the guide and which has, at its free end, a flanged edge 44 which ensures that the guide is held longitudinally. The flanged edge will be able to comprise, on its internal face, turned towards the interior of the fixing area, a spur, here not visible, which reduces the distance between the support face and the flanged edge as necessary.

The support face has the appropriate curvature for the light guide to bear against this support face over its entire height.

The support face is extended at its bottom vertical end by a substantially U-shaped reception recess, a first wing 48 of which is formed by the bottom end of the support face, of which the bottom wall 50 extends the first wing at right angles, protruding from the support face, and of which the second wing 52 is formed by a return wall which extends the bottom wall substantially at right angles. An aperture 54 is formed in the bottom wall to allow light diffusion by the light source to pass through, the bottom being positioned between the light source and the light guide.

The bottom wall comprises, on its outer face, turned away from the reception recess indexing posts 55 suitable for co-operating with complementary indexing holes formed on the light source.

The recess further comprises first elements co-operating with second elements borne by the light guide to ensure that this guide is held in transverse position in the fixing deck. These first co-operating elements notably comprise a transverse guiding rail 58 and an abutment 59 positioned at the end of this ramp, formed integrally with the first wing of the recess, and a tenon extending longitudinally inside the recess and formed integrally with the second wing (and not visible in the figures).

Figures 2, 3:
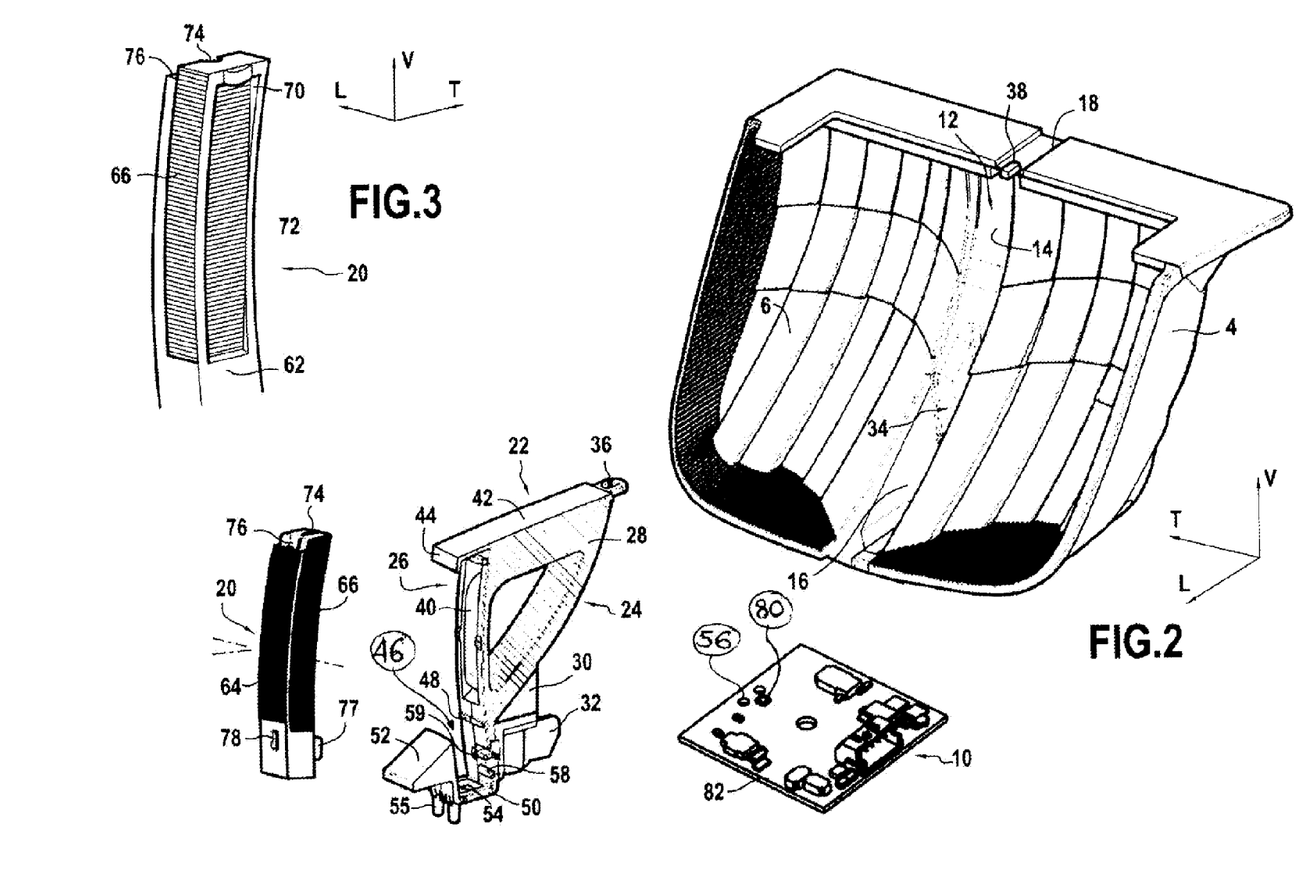
FIG. 2 is a perspective representation similar to that of FIG. 1, in which the components of the light module, namely two collectors borne by a support means, a fixing deck, a light guide and a printed circuit board bearing a light-emitting diode, are represented in exploded fashion.
FIG. 3 is a partial perspective view from three-quarter rear, of the light guide illustrated in FIG. 2.

The return wall formed by the second wing 52 of the recess ensures that the bottom part of the light guide 20 is held longitudinally. As can be seen in FIGS. 1 and 2, the return wall will be able to be given a form adapted to follow the curvature of the collector extending alongside the light guide.

The light guide 20 has a tubular form of square section, with four sides and two opposing bases which extend substantially horizontally when the guide is in place in the housing, and that will be called bottom base and top base according to their positioning in the housing in arbitrarily chosen orientation.

The light guide is produced in a transparent material such as polymethylmethacrylate (also referred to by the acronym P.M.M.A) suitable for allowing light to pass through. It comprises an input face positioned facing the light source and a plurality of output faces through which the light rays, guided inside the guide 20 by successive internal reflections, are refracted.

The input face is formed by the bottom base, facing which is placed the light source 10. The input face can have the form of a collimator to facilitate the routing of the light rays inside the light guide.

Of the four sides, there is a side which serves as contact face 62 against the guide support and there are three sides which each form an output face of the light rays. A main output face 64 is opposite the contact face and two additional output faces 66 (only one being visible, whether it be in FIG. 1, 2 or 3) respectively linking a transverse end of the main output face 64 and the corresponding transverse end of the contact face 62 such that they are each adjacent to the main output face 64. It is therefore notable that the additional output faces extend in a plane that is not parallel to the plane in which the main output face extends. It will be observed, thus, that the main output face is oriented to emit rays substantially parallel to the optical axis of the vehicle, and that the additional output faces are oriented for the light rays made to exit from the guide through them to be directed toward the collectors.

In the embodiment illustrated in FIGS. 1 to 3, the additional output faces are, more particularly, substantially at right angles to the main output face and to the contact face, such that the light guide has, in a longitudinal and transverse cross-sectional plane, a substantially rectangular form.

On the guide, there are a top part specific to the transmission of light rays and a bottom part bearing means for fixing the guide onto the fixing deck.

The main output face 64 is provided with toruses in the form of pillows, whereas the additional output faces 66 are provided with prismatic elements.

A distinction is drawn between the first type of optical coating made of pillows and the second type of optical coating made of prismatic elements, in that the first type of coating allows for strong refraction of the light rays impacting on the corresponding face of the guide, for the distribution and the dispersal of the light beam at the output and in that the second type of coating makes it possible equally to refract the light toward the collectors toward which the corresponding face of the guide is turned and internally reflect the light rays toward the main output face. It should be noted however that the prisms are arranged along a curvature specifically for guiding the light mainly toward the main output face, and that it is a restricted portion of the light rays which passes through the additional output faces to illuminate the collectors.

It is also possible to provide such prismatic elements on the contact face to reflect and diffract the rays running through the guide. The presence of the support face of the fixing deck facing the contact face of the light guide makes it possible to avoid the diffusion of light rays leaving the guide at the contact face. To this end, as is illustrated in FIG. 3, the contact face advantageously has a frame 70 which follows the curvature of the support face of the deck on which the guide rests, and which surrounds a central part 72 provided with prisms whose curvature seen from the rear of the guide is distinct from that of the frame.

A notch 74 is produced at the top of the front face, on a strip 76 without any "pillows" and essentially intended to ensure that the guide is held in position, the notch being suitable for co-operating with the spur produced on the internal face of the flanged edge when the light guide is inserted into the fixing deck.

In the bottom part of the guide bearing means for fixing the guide onto the deck, a tongue 77 is provided on the contact face of the guide, of a height equal to the center distance between the guiding rails provided on the fixing deck. A mortise 78 is further provided on the front face of the guide, suitable for co-operating, when the guide is in place in the deck, with the tenon formed integrally with the second wing and described previously.

There now follows a description as to how the form of the guide makes it possible to produce the function of the invention whereby a direct lighting in a first direction and a diffuse lighting in at least one second direction are combined to increase the minimum lighting surface area.

The light rays emitted in these two types of lighting are from the secondary light source which is advantageously distinct from the primary light sources, such that it ensures only the daytime running light function.

The secondary light source is fixed onto the support means facing the input face of the light guide. Here, the secondary light source is mounted under the support means, the source then being suitable for emitting upward.

In the example described, the light source is a light-emitting diode borne by a printed circuit board 82 and suitable for emitting light rays according to an electrical control instruction. It will be understood that other types of light sources could be used without departing from the context of the invention.

As can be seen in FIG. 2, two indexing holes are produced in the printed circuit board of a diameter substantially equal to the diameter of the indexing posts 55 borne by the fixing deck, on the outer face of the bottom wall of the recess. There is thus an assurance, through the co-operation of these indexing means borne by the board bearing the diode and by the deck bearing the light guide, that the position of the guide relative to the light source is correct for the light rays to enter in a standard manner through the input face of the light guide.

There now follows a more detailed description of the assembly and operation of the invention in order to understand in particular the dual type of lighting produced by the two daytime running lights according to the invention, namely a direct lighting through the main output face of the guide and an indirect lighting through the additional output faces by reflection on the collectors, and in order to understand, for example, the dual function of each collector, namely, on the one hand, the precise optical deflection that they produce on the light rays from the primary light sources so that they leave from the module parallel to the optical axis and, on the other hand, the less controlled optical deflection that they produce on the light rays from the secondary light sources, the important thing here being that they are reflected without their post-reflection direction being critical.

Initially, the light guide is mounted on the fixing deck, and, to this end, the guide is inserted laterally into the fixing area, in such a way that the top of the guide is inserted between the support face and the flanged edge of the fixing area and in such a way that the bottom part of the guide is inserted into the reception recess, between the first wing and the second wing. The guiding is facilitated by the co-operation of the tongue with rails until the abutment is encountered. In this position, in the bottom part, there is the tenon formed on the reception recess which co-operates with the mortise formed in the bottom part of the light guide and, in the top part, there is the notch formed on the front face of the guide which co-operates with the spur borne by the flanged edge, and there is thus an assurance that the guide will be held in position.

The light guide is then immobilized in the three positions of space by the fixing deck. For dismantling, the guide can be removed from the deck by sliding from the same side, by forcing the tenon and the mortise apart.

The guide is fixed in position in a non-removable manner when the fixing deck is mounted on the support means of the collector.

To this end, the anchoring area is pressed against the intermediate area positioned between the two collectors, by bringing the fixing deck vertically so that the bottom part of the anchoring area penetrates into the housing, then by pushing it longitudinally against the intermediate area so as to plug the male fixing element of the anchoring area into the socket formed in the housing. The elasticity of the eyelet formed at the top end of the anchoring area is then exploited to pass it around the pin positioned on the support means.

In this position, it can be seen that the light guide is definitively immobilized transversely by the collectors.

The printed circuit board, on which the secondary light source has been placed, is then mounted. The position of this board is indexed by the co-operation of the holes that it bears with the indexing pins borne by the fixing deck and protruding under the collector means, and the board is screw-fastened onto the support means in this indexed position.

In this way, the secondary light source is placed correctly relative to the input face of the light guide. The emitted light penetrates the guide and is directed mainly vertically, toward the top base of the guide against which all the rays are returned in the guide by total internal reflection. In one direction or the other, the rays directed toward the front face leave by refraction, facilitated by the optical "pillow" forms, to produce the daytime running light function in the optical axis. For their part, the rays directed toward the rear face are advantageously reflected toward the main output face, such that the photometric quality of the daytime running lights is increased, and some of these rays can be directed toward the lateral faces, which form the additional output faces such that the light can be refracted toward the collectors facing which they extend respectively. The lighting surface area is thus increased since the light does not leave only through the main output face, giving the impression that it is all of the surface covered by the collectors which participates in the daytime running light function.

The above description clearly explains how the invention makes it possible to achieve the objectives set for it and notably that of a light module which makes it possible to divide up the output areas of the light rays at the output of the guide, in order to distinctly deal with the two issues of photometry and minimum lighting surface area.

The light guide is configured for a small quantity of light to escape from the sides and illuminates the collectors positioned to the side, which then have a second function, in addition to their primary function of deflecting the light emitted by the primary light sources for a high beam and low beam function.

According to the invention, the photometry, on the one hand, ensured by the light rays leaving through the main output face, on which the light is originally focused and through which the light rays leave mainly parallel to the optical axis, and on the other hand the extent of the lighting surface area, obtained by the rays from the main output face and by the reflection of the rays in the collector, are dealt with separately. In this way, the minimum lighting surface area is observed, whereas it would not be by the illumination of the main output face alone, since it is chosen to be smaller for design reasons in particular.

Provision could be made to position the diode in the optical axis, longitudinally behind the support face, one portion of which would then form the input face. The diode could then be housed in the hollowed-out part of the anchoring area.

Furthermore, the arrangement of the light module according to the invention is also advantageous when the high and low beams operate and the daytime running lights are de facto off. The narrowness of the light guides associated with the daytime running lights does not hamper the lighting by the collectors in their main function. The compactness is facilitated without penalizing the efficiency of the different lighting functions.

A lighting function is thus advantageously produced in which the regulatory standards imposed are observed as are the design wishes of the players in the motor vehicle market.

Figure 4:
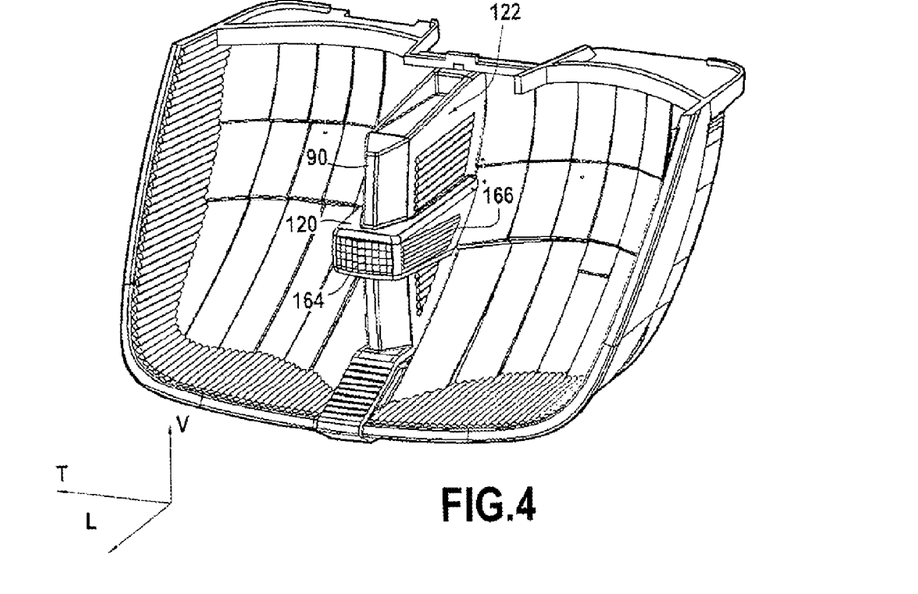
FIGS. 4 and 5 are views similar to the view of FIGS. 1 and 2 of a light module according to a second embodiment, particular notably in the form of the light guide and of the fixing deck.
Figure 5:
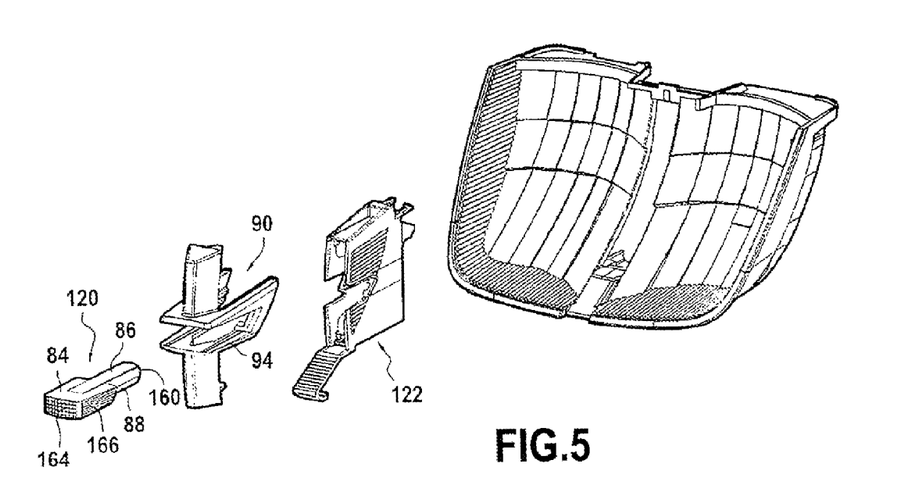

These advantages are also obtained by a second embodiment of the invention, illustrated in FIGS. 4 and 5, in which the light guide differs in that it does not extend over the entire height of the collectors. It will be understood that, in the following description of this second embodiment, the same numerical references will be employed for similar elements, by adding 100 to the reference given for the corresponding element in the first embodiment.

The light guide 120 is no longer of a single piece with a substantially straight tube which extends vertically, but it comprises two parts including a substantially parallelepipedal head 84 and a body 86 formed by a tube which extends longitudinally.

The tube has a free end 88 forming an input face 160 for the light which emerges in the head, which has, in a manner similar to the preceding embodiment, three output faces. The main output face 164 is arranged in the axial extension of the tube, and, as previously, the additional output faces 166 (here again, only one additional output face can be seen in FIGS. 4 and 5) are each adjacent to the main output face 164, by extending respectively in a plane that is not parallel to the plane in which the main output face extends. As illustrated in the figures by way of example, these additional output faces 166 can be positioned substantially at right angles to the main output face. The output faces are provided with pillows and prismatic elements in a manner similar to that of the first embodiment.

The particular form of the light guide implies a different positioning of the secondary light source and the presence of an intermediate fairing 90 between the fixing deck 122 and the light guide 120.

The secondary light source, which cannot be seen in FIGS. 4 and 5, is borne by the fixing deck, so as to be located facing the input face of the light guide. In this way, the form of the fixing deck is also modified in that it is not in the form of a box that is opened toward the front to receive the light guide and kept on this opening by the intermediate fairing. The light source is therefore fixed onto the bottom wall, opposite the opening of the deck.

As previously, the fixing deck comprises an anchoring area bearing snap-fitting means suitable for securing the deck to the support means between the collectors, and a fixing area suitable this time for co-operating with the intermediate fairing and not directly with the light guide.

The intermediate fairing 90 comprises a vertical bar 92 suitable for being snap-fitted onto the fixing deck to cover the opening, the bar being cut at mid-height by an accommodating portion 94 of a form corresponding to the form of the head of the light guide.

The overall operation is similar to that described previously, the light being suitable for leaving from the light guide mainly through the output face positioned transversely to the optical axis, and more randomly through the lateral additional output faces for a lighting of the collectors. It will be observed that, here, the secondary light source is positioned in such a way that the light rays that it emits are directly targeted toward the main output face.

Obviously, various modifications can be made by those skilled in the art to the exemplary embodiments of the light module according to the invention which have just been described in a nonlimiting manner.

By way of example, the orientation and the type of the means for anchoring the fixing deck in the support means will be able to differ without departing from the context of the invention.

Similarly, embodiments of the invention have been described in which the module comprises two collectors. It will be understood that the description will be able to be read without particular difficulty by applying it to a module in which there is only one collector, the additional optical system being located on the side, or in which there are more than two collectors, at least one additional optical system being provided between two neighboring collectors. In the case where the module support means bears a single collector and where a single light guide is placed to one side of the collector, it will be understood that the light guide can advantageously have only one additional output face, turned toward this collector.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A light module comprising means for supporting at least one collector of light rays emitted by a primary light source, said light module comprising a light guide having an input face and at least two distinct output faces, at least one of said at least two distinct output faces comprises a main output face and another of said at least two distinct output faces comprises at least one additional output face, said light guide being suitable for guiding said light rays emitted by a secondary light source from said input face to each of said at least two distinct output faces, wherein said light rays from said secondary light source pass through said main output face in a first direction and pass through said at least one additional output face in a second direction that is different from said first direction, said at least one additional output face being oriented such that said light rays leaving said light guide through said at least one additional output face are directed in said second direction toward said at least one collector;

wherein said light module comprises a fixing deck having an anchoring area for anchoring or fixing said light guide in operative relationship to said at least one collector and a fixing area where said light guide is fixed to said fixing deck;

wherein said light guide is detachably mounted to said fixing deck at said anchoring area so that said main output face lies in a first plane and emits light rays from said secondary light source in said first direction and said at least one additional output face lies in a second plane that is not coplanar with said first plane;

wherein each of said main output face and said at least one additional output face comprises optics comprising at least one of pillows or prismatic elements;

wherein said light guide is generally tubular and said light rays that transmit from said secondary light source through said main output face and said at least one additional output face are distinct from and performs a function different to light rays emitted by said primary light source; and wherein said light guide comprises a portion without any optics that is adapted to ensure that said light guide is held or secured in a fixed position on said fixing deck.

2. The light module according to claim 1, wherein said at least one additional output face is angled with respect to said main output face.

3. The light module according to claim 1, wherein said light guide is produced in a material suitable for being passed through by light, said material being a transparent polymethylmethacrylate or polycarbonate material.

4. The light module according to claim 1, wherein said main output face and/or said at least one additional output face comprises toruses taking the form of pillows, prismatic elements, ridges or graining.

5. The light module according to claim 4, wherein said main output face is provided with toruses taking the form of pillows.

6. The light module according to claim 4, wherein said at least one additional output face is provided with prismatic elements.

7. The light module according to claim 1, wherein said light guide and said secondary light source are respectively fixed onto said support means such that said secondary light source is positioned facing said input face of said light guide.

8. The light module according to claim 1, wherein said light guide is fixed onto said support means via a fixing deck.

9. The light module according to claim 8, wherein said fixing deck comprises an anchoring area bearing means for fixing said fixing deck onto said support means, and a fixing area for said light guide.

10. The light module according to claim 1, wherein said light guide comprises a single collector suitable for deflecting said light rays emitted by said primary light source as well as an additional optical system positioned to one side of said single collector and which comprises said secondary light source suitable for emitting said light rays into said light guide, said light guide comprising two output faces, one of said two output faces being oriented toward said single collector.

11. The light module according to claim 1, wherein said primary light source comprises a first primary light source and a second primary light source, wherein said support means bears a first collector and a second collector suitable for deflecting, substantially parallel to an optical axis, said light rays emitted by said first and second primary light sources, respectively, associated with said first and second collectors, and an additional optical system positioned between said first and second collectors and which comprises said secondary light source suitable for emitting said light rays into said light guide, said light guide comprising three output faces, including said main output face substantially at right angles to said optical axis and two opposing secondary output faces and respectively oriented toward each of said first and second collectors.

12. The light module according to claim 11, wherein said light guide extends substantially over an entire height of said first and second collectors and has a tubular form, said secondary light source being positioned under at least one of said first and second collectors facing an input face of said light guide formed at an axial end of said light guide and wherein said additional optical system further comprises a fixing deck via which said light guide is fixed onto said support means.

13. The light module according to claim 12, wherein said fixing deck comprises an anchoring area bearing means for fixing said fixing deck onto said support means, and a fixing area for said light guide.

14. The light module according to claim 13, wherein said fixing area is arranged to allow the insertion of said light guide laterally into said fixing deck, and in that it has snap-fitting means co-operating with complementary snap-fitting means borne by said light guide to keep the latter in position in said fixing deck.

15. The light module according to claim 2, wherein said light guide is produced in a material suitable for being passed through by light, said material being a transparent polymethlymethacrylate or polycarbonate material.

16. The light module according to claim 2, wherein said primary light source comprises a first primary light source and a second primary light source, wherein said support means bears a first collector and a second collector suitable for deflecting, substantially parallel to an optical axis, said light rays emitted by said first and second primary light sources, respectively, associated with said first and second collectors, and an additional optical system positioned between said first and second collectors and which comprises said secondary light source suitable for emitting said light rays into said light guide, said light guide comprising three output faces, including said main output face is angled with respect to said optical axis and two opposing secondary output faces and respectively oriented toward each of said first and second collectors.

17. A light module comprising a means for supporting at least one collector of light rays, emitted by a primary light source, in the vicinity of which there is a light guide suitable for guiding said light rays emitted by a secondary light source from an input face to at least two distinct output faces including a main output face, through which said light rays pass in a first direction, and at least one additional output face which is oriented such that said light rays leaving said light guide through said at least one additional output face are directed toward said at least one collector, in a second direction distinct from said first direction, said at least one additional output face being adjacent to said main output face;
  wherein said light guide is fixed onto said support means via a fixing deck;
  wherein said fixing deck comprises an anchoring area bearing means for fixing said fixing deck onto said support means, and a fixing area for said light guide;
  wherein said light module comprises an intermediate fairing-forming element positioned between said fixing deck and said light guide.

18. A light module comprising a means for supporting at least one collector of light rays, emitted by a primary light source, in the vicinity of which there is a light guide suitable for guiding said light rays emitted by a secondary light source from an input face to at least two distinct output faces including a main output face, through which said light rays pass in a first direction, and at least one additional output face which is oriented such that said light rays leaving said light guide through said at least one additional output face are directed toward said at least one collector, in a second direction distinct from said first direction, said at least one additional output face being adjacent to said main output face; wherein said primary light source comprises a first primary light source and a second primary light source, wherein said support means bears a first collector and a second collector suitable for deflecting, substantially parallel to an optical axis, said light rays emitted by said first and second primary light sources, respectively associated with said first and second collectors, and an additional optical system positioned between said first and second collectors and which comprises said secondary light source suitable for emitting said light rays into said light guide, said light guide comprising three output faces, including said main output face substantially at right angles to said optical axis and two opposing secondary output faces and respectively oriented toward each of said first and second collectors; wherein said light guide extends substantially to mid-height of at least one of said two collectors and comprises a head bearing said output faces and a tubular body extending said head substantially along the optical axis, a light source being positioned facing an input face positioned at an end of said tubular body opposite to said head and wherein said additional optical system further comprises a fixing deck and an intermediate fairing via which said light guide is fixed onto said support means, said intermediate fairing being adapted to bear said light guide and to be fixed onto said deck, said deck being fixed onto said support means.

19. A light module comprising a support for supporting at least one collector of light rays, emitted by a primary light source, in the vicinity of which there is a light guide suitable for guiding said light rays emitted by a secondary light source from an input face to at least two distinct output faces including a main output face, through which said light rays pass in a first direction, and at least one additional output face which is oriented such that said light rays leaving said light guide through said at least one additional output face are directed toward said at least one collector, in a second direction distinct from said first direction, said at least one additional output face having an angle with said main output face, wherein each of said main output face and said at least one additional output face comprises optics comprising at least one of pillows or prismatic elements.

20. A light module comprising a support for supporting at least one collector of light rays emitted by a primary light source, said light module comprising a light guide having an input face and at least two distinct output faces, at least one of said at least two distinct output faces comprises a main output face and another of said at least two distinct output faces comprises at least one additional output face, said light guide being suitable for guiding said light rays emitted by a secondary light source from said input face to each of said at least two distinct output faces, wherein said light rays from said secondary light source pass through said main output face in a first direction and pass through said at least one additional output face in a second direction that is different from said first direction, said at least one additional output face being oriented such that said light rays leaving said light guide through said at least one additional output face are directed in a second direction toward said at least one collector;

wherein said light module comprises a fixing deck having an anchoring area for anchoring or fixing said light guide in operative relationship to said at least one collector and a fixing area where said light guide is fixed to said fixing deck;

wherein said light guide is detachably mounted to said fixing deck at said anchoring area so that said main output face lies in a first plane and emits light rays from said secondary light source in said first direction and said at least one additional output face lies in a second plane that is not coplanar with said first plane;

wherein each of said main output face and said at least one additional output face comprises optics comprising at least one of pillows or prismatic elements;

wherein said light guide is generally tubular and said light rays that transmit from said secondary light source through said main output face and said at least one additional output face are distinct from and performs a function different to light rays emitted by said primary light source; and wherein said light guide comprises a portion without any optics that is adapted to ensure that said light guide is held or secured in a fixed position on said fixing deck.

\* \* \* \* \*